United States Patent
Wang

(10) Patent No.: US 7,682,197 B2
(45) Date of Patent: Mar. 23, 2010

(54) MEMORY CARD CONNECTOR WITH A POWER SWITCH

(75) Inventor: Hsu-Fen Wang, Hsin-Tien (TW)

(73) Assignee: Advanced Connectek Inc., Taipei Hsien (TW)

( * ) Notice: Subject to any disclaimer, the term of this patent is extended or adjusted under 35 U.S.C. 154(b) by 156 days.

(21) Appl. No.: 11/812,733

(22) Filed: Jun. 21, 2007

(65) Prior Publication Data

US 2008/0123319 A1    May 29, 2008

(30) Foreign Application Priority Data

Jun. 23, 2006  (TW) .............................. 95211037 U

(51) Int. Cl.
*H01R 24/00* (2006.01)
(52) U.S. Cl. ..................... 439/630; 439/489; 200/51.09
(58) Field of Classification Search ................. 439/630, 439/188, 489; 235/441; 200/51.09, 51.11
See application file for complete search history.

(56) References Cited

U.S. PATENT DOCUMENTS

| 6,315,587 B1 * | 11/2001 | Ikemoto et al. | 439/159 |
| 6,431,893 B1 * | 8/2002 | Chang et al. | 439/188 |
| 7,118,419 B1 * | 10/2006 | Lee | 439/630 |
| 2003/0236014 A1 * | 12/2003 | Hu et al. | 439/188 |

* cited by examiner

*Primary Examiner*—Edwin A. Leon
*Assistant Examiner*—Vanessa Girardi
(74) *Attorney, Agent, or Firm*—Muncy, Geissler, Olds & Lowe, PLLC

(57) ABSTRACT

A memory card connector has an insulative housing, a power switch and a plurality of conductive terminals. The power switch is mounted in the insulative housing, to detect a memory card and has a first detecting terminal and a second detecting terminal. The first and second detecting terminals are mounted in the insulative housing. The second detecting terminal selectively contacts the first detecting terminal to supply power to the memory card connector when the memory card is installed in the memory card connector. When the memory card is removed, the power switch cuts the power to the memory card connector to save power.

5 Claims, 4 Drawing Sheets

MEMORY CARD CONNECTOR WITH A POWER SWITCH

BACKGROUND OF THE INVENTION

1. Field of the Invention

The present invention relates to a connector, and more particularly to a memory card connector that has a power switch capable of detecting installation of a memory card to supply power to the memory card connector and cut power to the memory card connector when the memory card is removed.

2. Description of Related Art

Connectors are important interfaces to provide signal transmission between electrical devices. Memory cards with large storage space are used removably in many kinds of electrical devices such as digital cameras, digital photo printers, mobile phones, personal digital assistants (PDAs) and such like. Each electronic device requires a memory card connector to connect a memory card having a plurality of contacts.

A conventional memory card connector has an insulative housing and a row of terminals. The housing has a cavity. The cavity is defined in the housing and may accommodate a memory card. The terminals are resilient, are mounted securely in the cavity and connect respectively to the contacts on the memory card.

However, the conventional memory card connector does not have a power saving device, an important characteristic in handheld devices, because the memory card connector is always powered regardless of whether a memory card is installed or not.

Consequently, the conventional memory card connector has shortcomings and is becoming unmarketable and could be phased out.

To overcome the shortcomings, the present invention provides a memory card connector to mitigate or obviate the aforementioned problems.

SUMMARY OF THE INVENTION

The main objective of the invention is to provide a memory card connector that has a power switch capable of detecting installation of a memory card to supply power to the memory card connector and cut power to the memory card connector when the memory card is removed.

The memory card connector in accordance with the present invention comprises an insulative housing, a power switch and a plurality of conductive terminals. The power switch is mounted in the insulative housing to detect a memory card and has a first detecting terminal and a second detecting terminal. The first and second detecting terminals are mounted in the insulative housing. The second detecting terminal selectively contacts the first detecting terminal to supply power to the memory card connector when the memory card is installed in the memory card connector. When the memory card is removed, the power switch cuts the power to the memory card connector to save power.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
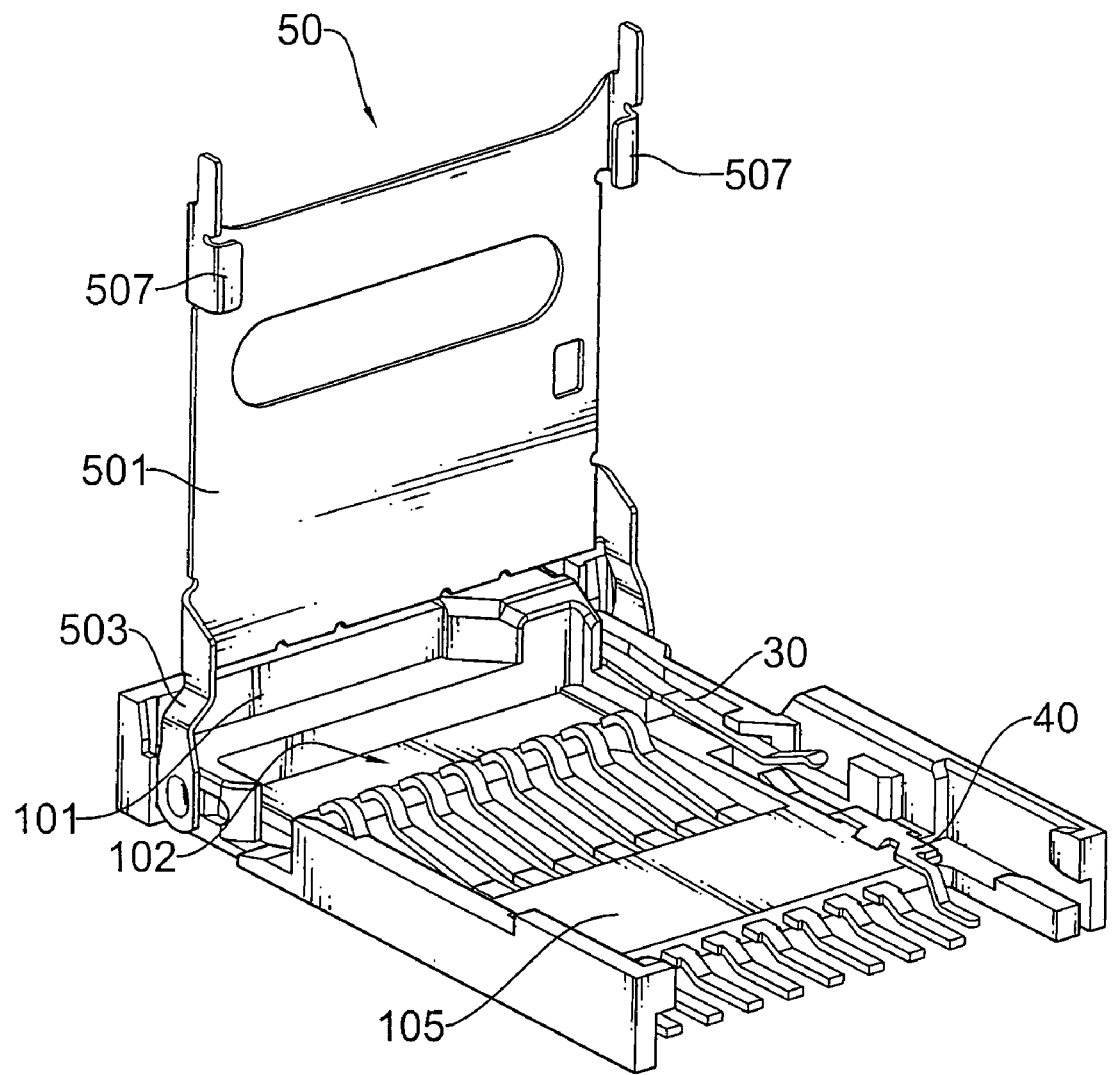
FIG. 1 is a perspective view of a memory card connector in accordance with the present invention.
Figure 3:
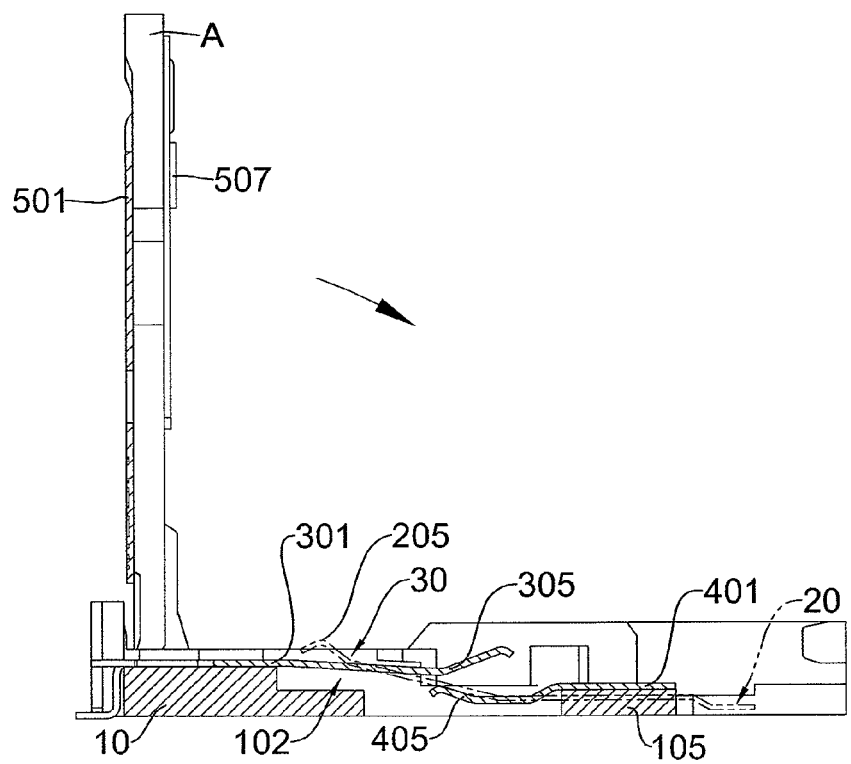
FIG. 3 is a side view in partial section of the memory card connector in FIG. 1 with a memory card inserted in the cover that is open.

With reference to FIGS. 1 and 3, a memory card connector in accordance with the present invention connects to an electric device and selectively connects to a memory card (A) having a plurality of contacts.

Figure 2:
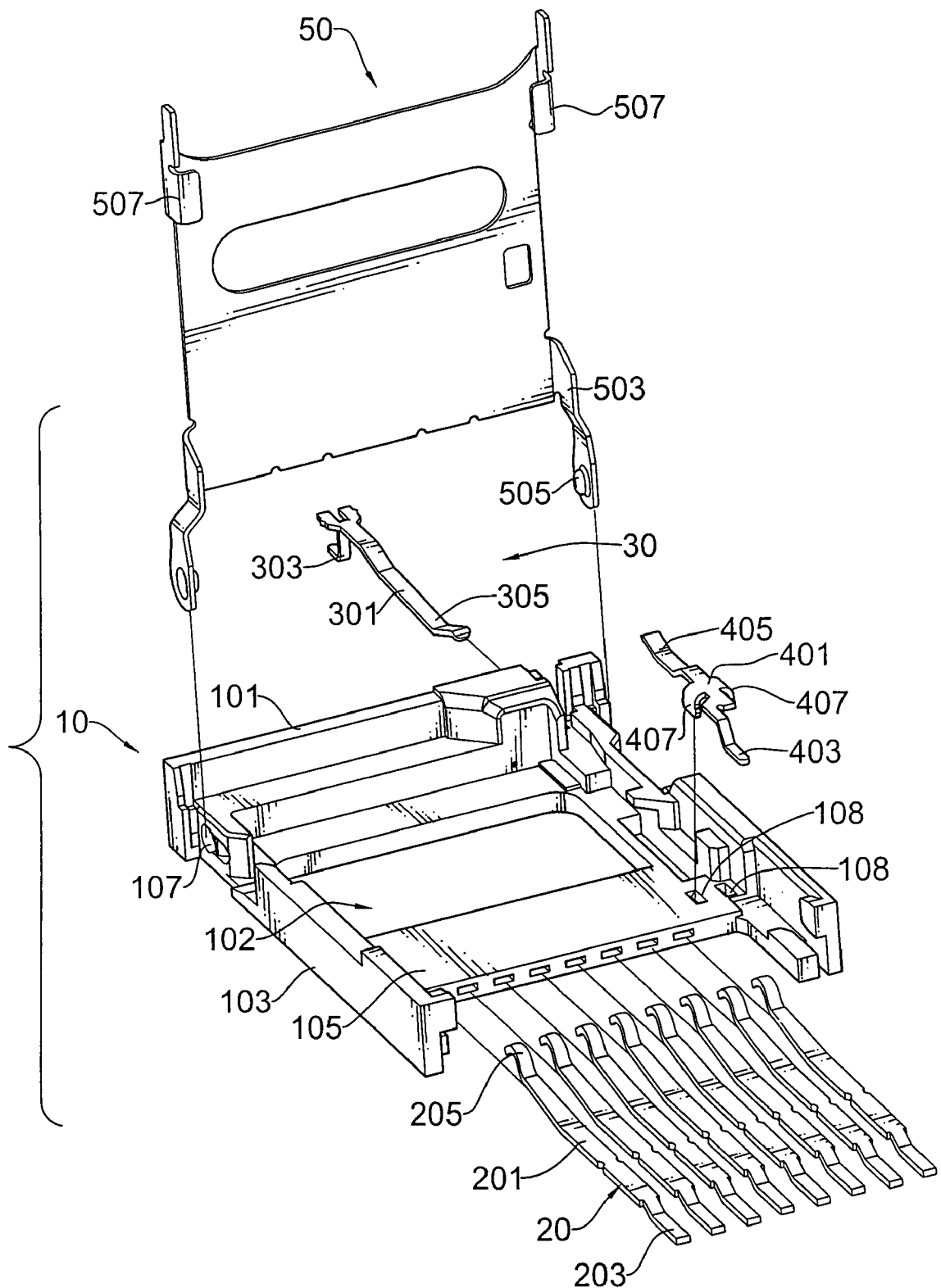
FIG. 2 is an exploded perspective view of the memory card connector in FIG. 1.

With further reference to FIG. 2, the memory card connector comprises an insulative housing (10), a power switch and a plurality of conductive terminals (20) and may further have a cover (50).

The insulative housing (10) has a bottom (105), two opposite sides (103), a rear (101) and a space (102) and may further have a pair of mounting holes (108) and a pair of mounting notches (107). The sides (103) are formed on and protrude from the bottom (105) and each side (103) has a rear end and a front end. The rear (101) is formed on and protrudes up from the bottom. The space (102) is defined in the insulative housing (10). The mounting holes (108) are defined in the bottom (105) of the insulative housing (10). The mounting notches (107) are defined respectively in the sides (103) of the insulative housing (10).

The power switch has a first detecting terminal (40) and a second detecting terminal (30). The power switch is mounted in the space (102) of the insulative housing (10), is capable of detecting the memory card (10) when the memory card (A) is installed, selectively supplies power to the memory card connector and the memory card (A).

The first detecting terminal (40) is mounted in the space (102) of the insulative housing (10), has a main portion (401), a soldering portion (403), and a first contact portion (405) and may further have a pair of mounting tabs (407). The main portion (401) is resilient. The soldering portion (403) is formed on and protrudes from the main portion (401) and connects to the electronic device. The first contact portion (405) is formed on and protrudes from the main portion (401). The mounting tabs (407) are formed on the main portion (401) of the first detecting terminal (40) and are mounted respectively in the mounting holes (108) in the bottom (105) of the insulative housing (10).

The second detecting terminal (30) is mounted in the space (102) of the insulative housing (10), selectively contacts the first detecting terminal (40) to supply power to the memory card connector and has a main portion (301), a soldering portion (303) and a second contact portion (305). The main portion (301) is resilient. The soldering portion (303) of the second detecting terminal (30) connects to the electronic device and is formed on and protrudes from the main portion (301). The second contact portion (305) is formed on and protrudes from the main portion (301) of the second detecting terminal (30), is positioned above the first contact portion (405) of the first detecting terminal (40) with respect to the bottom (105) of the insulative housing (10) and selectively contacts the first contact portion (405).

The conductive terminals (20) serve as power and signal transmission terminals to allow power and signal transmission between the memory card connector and the memory card (A), are mounted through the bottom (105) of the insulative housing (10) and extend into the space (102) in the insulative housing (10). Each conductive terminal (20) has a main portion (201), a soldering portion (203) and a memory-card contact portion (205). The main portion (201) is mounted in the insulative housing (10) and is resilient. The soldering portion (203) is formed on and protrudes from the main portion (201) and is connected to the electronic device. The memory-card contact portion (205) is formed on and protrudes from the main portion (201) of the conductive terminal (20), extends further above the second contact portion (305) of the second detecting terminal (30) with respect to the bottom (105) of the insulative housing (10) and may respectively contact the contacts of the memory card (A). Furthermore, the memory-card contact portion (205) is located closer to the rear of the insulative housing (10) than the first and second contact portions (405, 305) of the first and second detecting terminals (40, 30).

The cover (50) is mounted pivotally at the rear (101) of the insulative housing (10). The cover (50) has a mounting frame (501), a pair of leg portions (503) and a pair of retaining tracks (507). The mounting frame (501) has two opposite edges. The leg portions (503) are formed respectively on the edges of the mounting frame (501) and pivotally connect respectively to the sides (103) at the rear of the insulative housing (10). Each leg portion (503) may further have a boss (505) formed on the leg portion (503) and mounted in one of the mounting notches (107) of the insulative housing (10). The retaining tracks (507) are formed respectively on the edges of the mounting frame (501) and may slidably hold the memory card (A).

Figure 4:
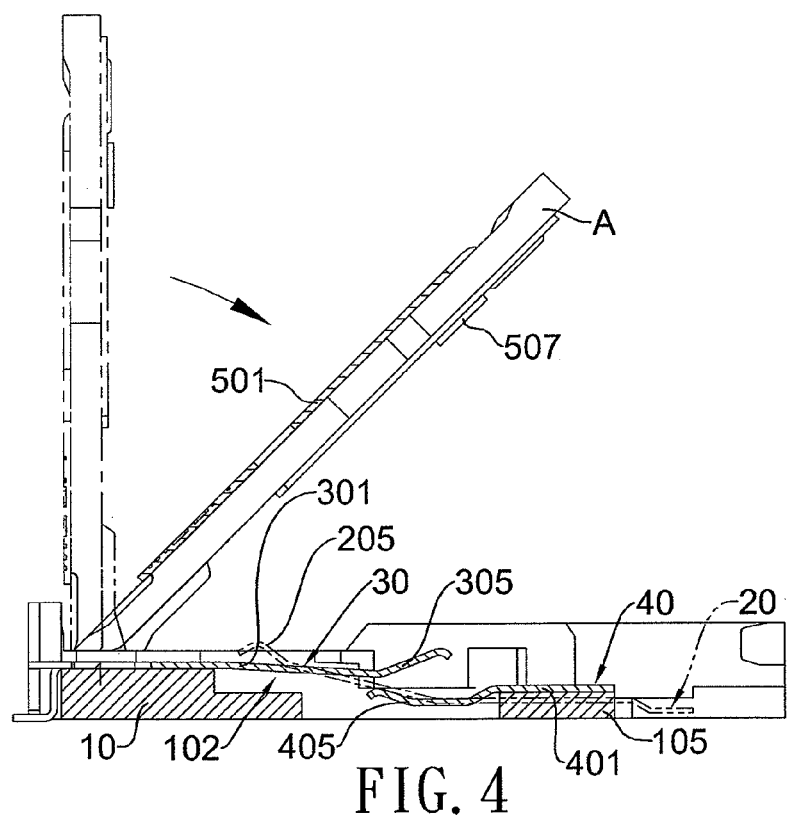
FIG. 4 is an operational side view in partial section of the memory card connector in FIG. 3 with the memory card inserted in the cover that is closed halfway.
Figure 5:
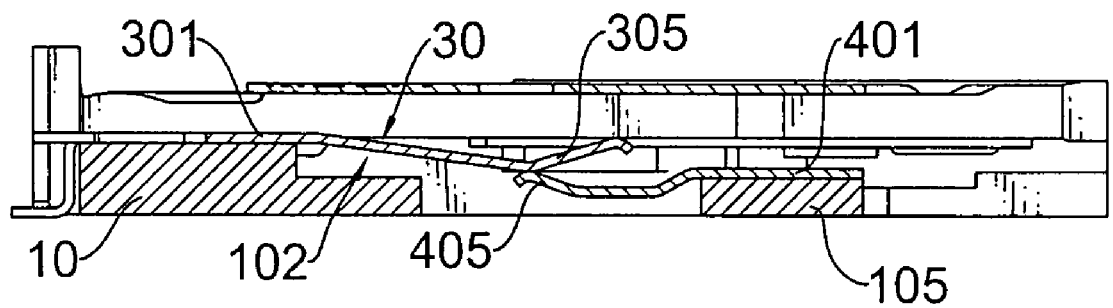
FIG. 5 is an operational side view in partial section of the memory card connector in FIG. 4 with the memory card inserted in the cover that is completely closed.

With further reference to FIGS. 3-5, to install the memory card (A) in the memory card connector, the cover (50) is opened and the memory card (A) is slid into the cover (50). The cover (50) containing the memory card (A) closes to make the contacts of the memory card (A) respectively contact the memory-card contact portions (205) of the conductive terminals (20). Because the cover (50) is mounted at the rear of the insulative housing (10) and the memory-card contact portions (205) of the conductive terminals (20) are located closer to the rear of the insulative housing (10) than the first and second contact portions (405, 305) of the first and second detecting terminals (40, 30), the memory card (A) presses the memory-card contact portions (205) before contacting the second contact portion (305). Then, the memory card (A) presses the second contact portion (305) of the second detecting terminal (30) into contact with the first contact portion (405) of the first detecting terminal (40) completing a circuit on the electric device to allow power from the electronic device to the conductive terminals (20). To remove the memory card (A), the cover (50) is opened and the second detecting terminal (30) breaks contact with the first detecting terminal (40) to break the circuit and power is no longer supplied to the conductive terminals (20).

Because the power switch on the memory card connector is capable of detecting the installation and removal of the memory card (A) and selectively supplies or cuts power to the memory card connector, the memory card connector saves power when no memory card is in the memory card connector.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A memory card connector adapted to connect to an electrical device and selectively connect to a memory card, the memory card connector comprising an insulative housing having
  a bottom;
  two opposite sides formed on and protruding up from the bottom and each side having a proximal end and a distal end;
  a rear formed on and protruding up from the bottom; and
  a space defined in the insulative housing;
a power switch mounted in the space in the insulative housing and having
  a first detecting terminal mounted in the space in the insulative housing and having
    a main portion being resilient;
    a soldering portion being formed on and protruding from the main portion; and
    a first contact portion formed on and protruding from the main portion; and
  a second detecting terminal mounted in the space of the insulative housing, selectively contacting the first detecting terminal and having
    a main portion being resilient;
    a soldering portion formed on and protruding from the main portion; and
    a second contact portion formed on and protruding from the main portion of the second detecting terminal, positioned above the first contact portion with respect to the bottom of the insulative housing and selectively contacting the first contact portion of the first detecting terminal;
a plurality of conductive terminals mounted through the bottom of the insulative housing, extending into the space and each conductive terminal having
  a main portion;
  a soldering portion formed on and protruding from the main portion; and
  a memory-card contact portion being formed on and protruding from the main portion of the conductive terminal, extending further above the second contact portion of the second detecting terminal with respect to the bottom of the insulative housing and located closer to the rear of the insulative housing than the first and second contact portions of the first and second detecting terminals; and
a cover mounted pivotally at the rear of the insulative housing and selectively holding the memory card, wherein the conductive terminals are contacted first by a cover containing a card and secondly by the detecting terminal once the cover is closed.

2. The memory card connector as claimed in claim 1, wherein the cover has
  a mounting frame having two opposite edges;
  a pair of leg portions formed respectively on the edges of the mounting frame and pivotally connecting respectively to the edges at the rear the insulative housing; and
  a pair of retaining tracks formed respectively on the edges of the mounting frame into which the memory card slides.

3. The memory card connector as claimed in claim 2, wherein:
  the insulative housing further has a pair of mounting holes defined in the bottom of the insulative housing; and
  the first detecting terminal further has a pair of mounting tabs formed on the main portion of the first detecting terminal and the mounting tabs are mounted respectively in the mounting holes in the bottom of the insulative housing.

4. The memory card connector as claimed in claim 2, wherein:
the insulative housing further has a pair of mounting notches defined respectively in the sides of the insulative housing; and
each leg portion further has a boss formed on the leg portion and mounted respectively in the mounting notches of the insulative housing.

5. The memory card connector as claimed in claim 4, wherein:
the insulative housing further has a pair of mounting holes defined in the bottom of the insulative housing; and
the first detecting terminal further has a pair of mounting tabs formed on the main portion of the first detecting terminal and the mounting tabs are mounted respectively in the mounting holes in the bottom of the insulative housing.

* * * * *